United States Patent
Katano et al.

(10) Patent No.: US 12,217,112 B2
(45) Date of Patent: Feb. 4, 2025

(54) IC CARD AND METHOD FOR MANUFACTURING IC CARD

(71) Applicant: TOPPAN INC., Tokyo (JP)

(72) Inventors: Yukiko Katano, Tokyo (JP); Tetsuya Tsukada, Tokyo (JP); Shin Kataoka, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/134,959

(22) Filed: Apr. 14, 2023

(65) Prior Publication Data

US 2023/0259734 A1 Aug. 17, 2023

Related U.S. Application Data

(63) Continuation of application No. PCT/JP2021/035566, filed on Sep. 28, 2021.

(30) Foreign Application Priority Data

Oct. 22, 2020 (JP) .................................. 2020-177186

(51) Int. Cl.
G06K 19/07 (2006.01)
G06K 19/073 (2006.01)

(52) U.S. Cl.
CPC .............................. *G06K 19/07354* (2013.01)

(58) Field of Classification Search
CPC ............................................... G06K 19/07354
USPC ....................................................... 235/492
See application file for complete search history.

(56) References Cited

U.S. PATENT DOCUMENTS

| | | | |
|---|---|---|---|
| 2016/0104065 A1* | 4/2016 | Tsukada | G06K 19/07794 235/492 |
| 2017/0300799 A1* | 10/2017 | Breed | G06K 19/0718 |
| 2018/0357457 A1 | 12/2018 | Rasmussen et al. | |
| 2019/0019072 A1 | 1/2019 | Bertiaux et al. | |
| 2019/0130153 A1* | 5/2019 | Hu | H04M 1/026 |
| 2020/0234021 A1 | 7/2020 | Lu et al. | |
| 2024/0070425 A1* | 2/2024 | Lowe | G06Q 20/40145 |

FOREIGN PATENT DOCUMENTS

| | | |
|---|---|---|
| CN | 207489033 U | 6/2018 |
| JP | 2020-107101 A | 7/2020 |
| WO | WO-99/26195 A1 | 5/1999 |
| WO | WO-2018/200642 A1 | 11/2018 |

(Continued)

OTHER PUBLICATIONS

International Searching Authority, "International Search Report," issued in connection with International Patent Application No. PCT/JP2021/035566, dated Dec. 14, 2021.

(Continued)

*Primary Examiner* — Daniel A Hess
(74) *Attorney, Agent, or Firm* — Foley & Lardner LLP

(57) ABSTRACT

An IC card provided with an IC chip, and configured to enable at least one of contact communication and contactless communication, the IC card including an ultrasonic fingerprint sensor connected to the IC chip and a storage unit in which fingerprint data for matching is stored. An outer surface of the IC card is formed of synthetic resin, and the ultrasonic fingerprint sensor is covered with the synthetic resin.

8 Claims, 4 Drawing Sheets

(56) References Cited

FOREIGN PATENT DOCUMENTS

WO WO-2018/221429 A1 12/2018

OTHER PUBLICATIONS

International Searching Authority, "Written Opinion," issued in connection with International Patent Application No. PCT/JP2021/035566, dated Dec. 14, 2021.
European Extended Search Report issued in corresponding European Patent Application No. 21882517.2 dated Mar. 26, 2024 (8 pages).

\* cited by examiner

IC CARD AND METHOD FOR MANUFACTURING IC CARD

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/035566, filed on Sep. 28, 2021, which in turn claims the benefit of JP 2020-177186, filed Oct. 22, 2020, the disclosures of all which are incorporated herein by reference in its entirety.

TECHNICAL FIELD

The present invention relates to an IC card, and more specifically an IC card provided with a fingerprint sensor, and a method for manufacturing the IC card.

The present application claims the benefit of priority from Japanese Patent Application No. 2020-177186 filed in Japan on Oct. 22, 2020, the contents of which are incorporated herein by reference.

BACKGROUND

IC cards are widely known as a contact communication medium and a contactless communication medium (for example, see PTL 1).

[Citation List] [Patent Literature] PTL 1: WO 99/26195.

SUMMARY OF THE INVENTION

Technical Problem

As IC cards provided with enhanced security, IC cards equipped with a capacitive fingerprint sensor are known. Because a capacitive fingerprint sensor requires a finger to directly contact a detection surface, the fingerprint sensor needs to be exposed on the surface of the card. Therefore, it is necessary to open a hole in the base material of the card, and to precisely align the fingerprint sensor and the hole, which makes the manufacturing process complicated. Further, the holes also constrain the design of the card.

In view of the above circumstances, an object of the present invention is to provide an IC card and a method for manufacturing an IC card having a configuration that enhances security without restricting the design.

Solution to Problem

A first aspect of the present invention is an IC card including an IC chip and configured to enable at least one of contact communication and contactless communication.

The IC card includes an ultrasonic fingerprint sensor connected to the IC chip, and a storage unit in which fingerprint data for matching is stored.

An outer surface of the IC card is formed of synthetic resin, and the ultrasonic fingerprint sensor is covered with the synthetic resin.

A second aspect of the present invention is a method for manufacturing the IC card according to the first aspect.

The manufacturing method includes: mounting the IC chip, the ultrasonic fingerprint sensor, and the storage unit on a flexible substrate; arranging a frame made of resin on the flexible substrate to surround the IC chip, the ultrasonic fingerprint sensor, and the storage unit; and forming a cured resin layer that seals the IC chip and the storage unit by filling and curing the synthetic resin inside a space surrounded by the frame.

Effect of the Invention

The IC card and the method for manufacturing an IC card of the present invention have a configuration in which security is enhanced without restricting the design.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

A first embodiment of the present invention will be described below with reference to FIGS. 1 to 5.

Figure 1:
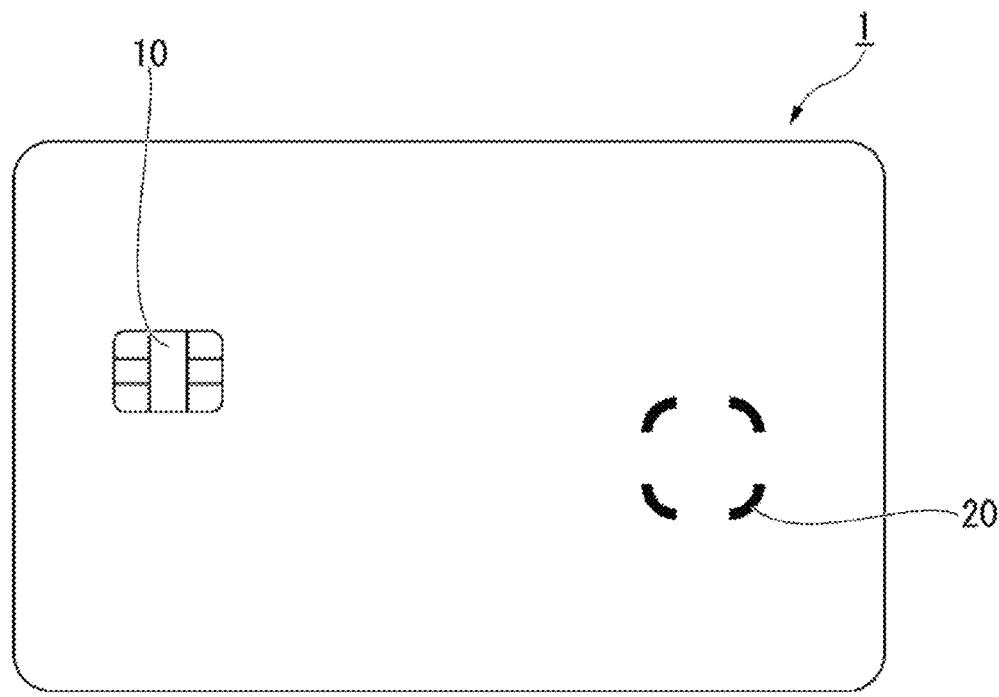
FIG. 1 is a schematic plan view of an IC card according to a first embodiment of the present invention.

FIG. 1 is a schematic plan view of an IC card 1 according to the present embodiment. As shown in FIG. 1, the IC card 1 includes a terminal 10 and a display 20 on the upper surface of the IC card 1. The terminal 10 is for contact communication, and is exposed on the outer surface of the IC card 1. The display 20 indicates the position of a fingerprint sensor, and is provided on the outer surface of the IC card 1.

The terminal 10 has a known configuration, for example, in which a copper pattern is formed on both sides of a base material made of glass epoxy, polyimide, or the like. The copper pattern is subjected to a plating process with nickel, palladium, gold, or the like.

The outer surface of the IC card 1 is made of synthetic resin. Such a configuration can be realized, for example, by sandwiching an internal structure that includes an IC module, a fingerprint sensor, and the like, between an upper resin substrate and a lower resin substrate, and then joining the upper resin substrate and the lower resin substrate by adhesion, heating, or the like. The details of the manufacturing procedure of the IC card 1 will be described later.

Figure 2:
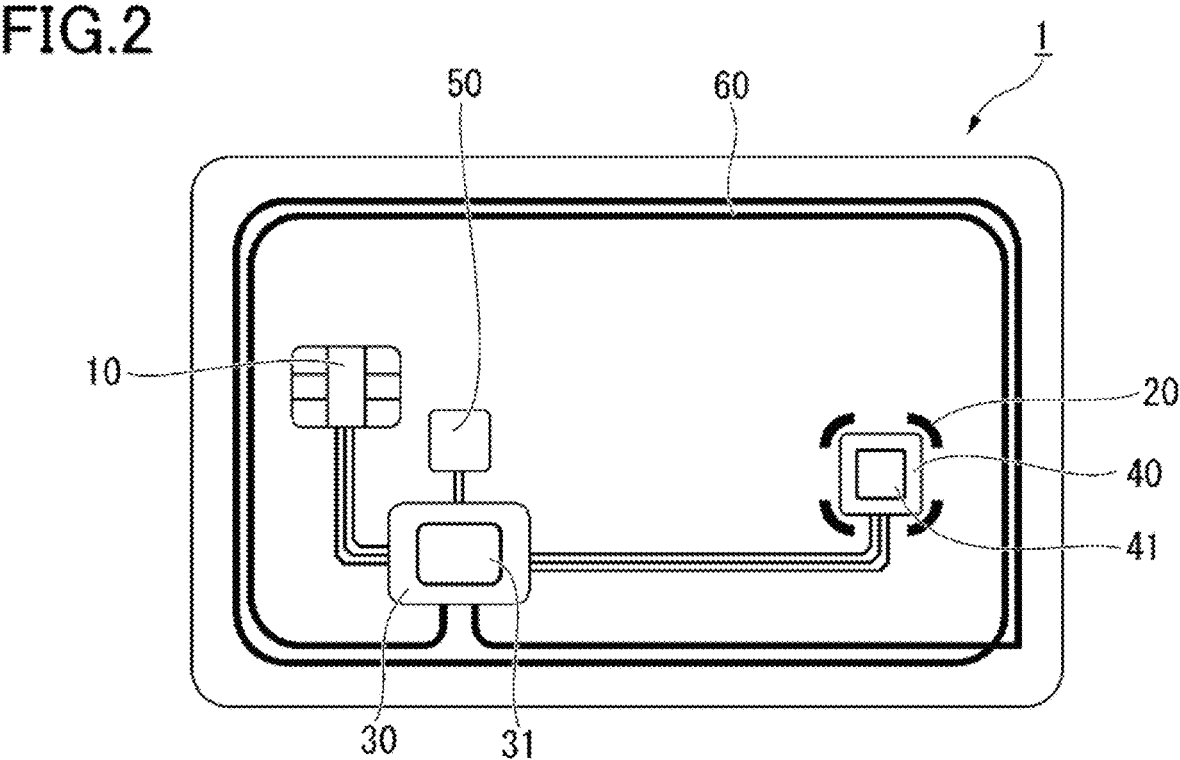
FIG. 2 is a transparent view showing the internal structure of the IC card in FIG. 1.

FIG. 2 is a transparent view showing the internal structure of the IC card 1 in the same posture as FIG. 1. The IC card 1 includes an IC module 30, a fingerprint sensor module 40, a memory IC 50, and a loop antenna 60.

The IC module 30 includes an IC chip 31. The IC module 30 performs communication between the IC card 1 and an external device, matching and authentication of a fingerprint detected by the fingerprint sensor module 40, and the like. The IC module 30 is connected to each of the terminal 10, the fingerprint sensor module 40, the memory IC 50, and the loop antenna 60.

The fingerprint sensor module 40 includes a sensor unit 41 that reads a fingerprint, and an IC chip that controls the operation of the sensor unit 41, and is connected to the IC module 30 (IC chip 31).

A known ultrasonic fingerprint sensor is used as the sensor unit 41. Since the ultrasonic waves emitted by an ultrasonic fingerprint sensor can pass through exterior members such as glass and plastic, a fingerprint can be read without touching the sensor unit 41. Therefore, it is not necessary to expose the sensor unit 41 on the surface of the IC card 1, and the user can recognize the position of the sensor unit 41 provided that the display 20 is present.

The memory IC 50 includes a storage area and an IC chip, and is connected to the IC module 30. The storage area can store one or more fingerprint data for matching, and provides the stored fingerprint data to the IC module 30 in response to a request from the IC module 30.

The loop antenna 60 has a configuration in which a conductor is formed in a loop shape, and is connected to the IC module 30. The loop antenna 60 is formed by appropriately using jumper wires, vias, or the like so that the wires do not touch each other.

The IC card 1 is configured as a dual IC card that can perform both contact communication and contactless communication by providing the loop antenna 60. Furthermore, power can be supplied to the fingerprint sensor module 40 by wireless power supply from an external device via the loop antenna 60.

An example of a manufacturing procedure of the IC card 1 configured as described above will be described.

First, a flexible substrate (FPC) for mounting the internal structure is prepared. The configuration of the FPC is known, and includes, for example, a conductor layer that forms a circuit pattern on both sides of a base material made of polyimide with a thickness of about 50 µm. For example, the thickness of the conductor layer including the plated layer can be 25 for example.

Next, the conductor layer of the FPC is patterned to form the loop antenna 60 and the wiring that connects each component of the internal structure, and then the internal structure, such as the terminal 10, the IC module 30, the fingerprint sensor module 40, and the memory IC, is mounted on the FPC. Examples of the mounting method include solder surface mounting (SMT), and thermocompression bonding using an anisotropic conductive film (ACF) or an anisotropic conductive paste (ACP). A large number of IC cards 1 can be manufactured by forming a plurality of sets of internal structures on a large-area FPC.

Then, a plastic (resin) frame is arranged from above the internal structure, and the frame and the FPC are bonded together so that the entire internal structure, including the loop antenna 60, is surrounded by the frame. An adhesive agent may be applied to the frame in advance.

Figure 3:
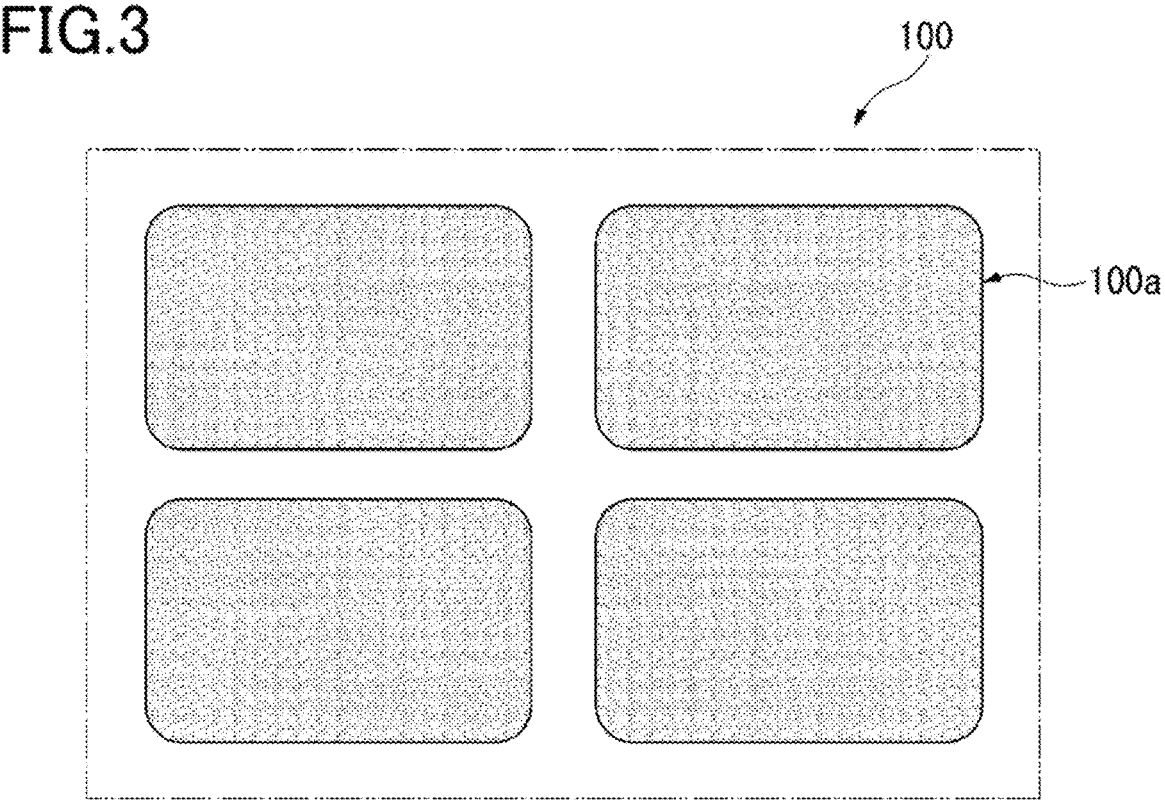
FIG. 3 is a diagram showing an example of a frame used for manufacturing the IC card in FIG. 1.

FIG. 3 shows an example of a frame 100 for mass production. The frame 100 has a plurality of frame-shaped regions 100a, and an internal structure can be arranged within each frame-shaped region 100a. The dimensions of the frame-shaped region 100a in plan view are somewhat smaller values than the dimensions of the IC card 1 in plan view. For example, by making the frame-shaped region 100a smaller by 5 mm per side in the long side direction and the short side direction of the substantially rectangular shape in plan view, it is possible to form a substantially rectangular shape which is 10 mm smaller than the dimensions of the IC card 1 in plan view in the long side direction and the short side direction.

Examples of materials that can be used for the frame 100 include polyvinyl chloride (PVC), polyethylene terephthalate copolymer (PET-G), and polyethylene terephthalate (PET).

As a general rule, the thickness of the frame 100 is equal to or greater than the height of the tallest member of the internal structure that is not exposed on the surface of the IC card 1 except for the terminal 10, and is less than the height of the terminal 10. When expressed numerically, for example, the thickness is about 450 µm.

Figure 4:
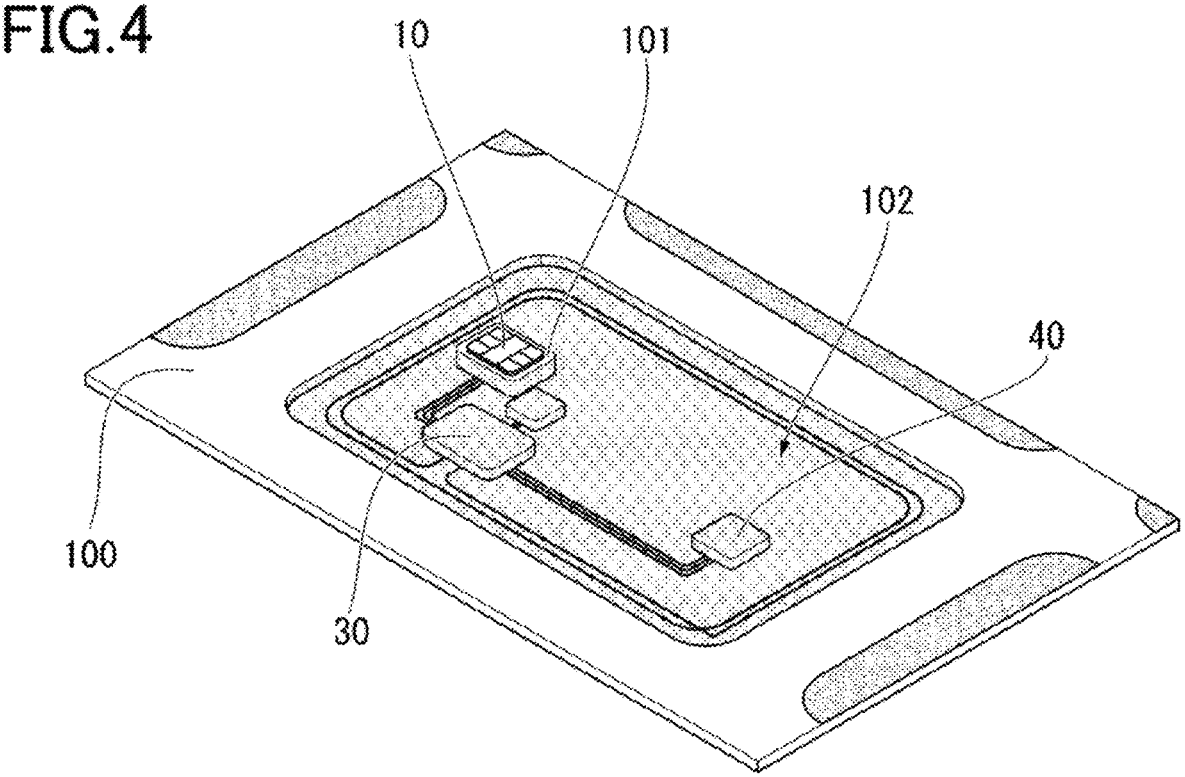
FIG. 4 is a diagram showing a process performed while manufacturing the IC card in FIG. 1.

Further, as shown in FIG. 4, an auxiliary resin frame 101 is arranged to surround the terminal 10. Because the shape of the inside of the auxiliary resin frame 101 in plan view is approximately the same as that of the terminal 10, and the size of the auxiliary resin frame 101 is approximately the same as that of the terminal 10, the auxiliary resin frame 101 is slightly larger than the terminal 10. The width of the auxiliary resin frame 101 in plan view is, for example, 5 mm.

Next, a liquid synthetic resin is poured into the space between the frame 100 and the auxiliary resin frame 101, and covered with a surface-treated plastic film that is easily detachable to apply a pressure that uniformly spreads the resin poured inside. Then, when the synthetic resin is cured, the cured resin is arranged between the frame 100 and the auxiliary resin frame 101 up to approximately the same height as the frame 100 and the auxiliary resin frame 101, and a cured resin layer is formed that seals each component of the internal structure such as the IC module 30 and the memory IC 50.

Suitable liquid synthetic resins include ultraviolet curable resins and two-liquid type curable resins. When an ultraviolet curable resin is used, it is covered with a transparent plastic film, and after the ultraviolet curable resin is uniformly spread, ultraviolet light is irradiated through the plastic film.

In the step described above, a hole may be provided in the plastic film so that excess resin can escape through the hole.

Furthermore, because the transmission of ultrasonic waves is adversely affected by the presence of air bubbles in the cured resin layer positioned above the sensor unit 41, it is preferable to form the cured resin layer to avoid air bubbles.

Other methods for eliminating air bubbles above the sensor unit 41 include a method that makes the fingerprint sensor module 40 the tallest component among the components of the internal structure. As a result of the fingerprint sensor module 40 being the tallest component and having the same thickness as the frame, the cured resin is arranged around the fingerprint sensor module 40 but not above the fingerprint sensor module 40.

When this method is adopted, one of the components of the internal structure may have the same height as the fingerprint sensor module 40. Moreover, when it is difficult to make only the fingerprint sensor module 40 the tallest component, the height may be increased by interposing an auxiliary substrate such as an interposer.

The plastic film is detached after curing the liquid resin.

FIG. 4 shows the state after the plastic film is detached. The cured resin layer 102 formed between the frame 100 and the auxiliary resin frame 101 covers each component of the internal structure which includes the fingerprint sensor module 40. Because the upper surface of the terminal 10 is arranged at a higher position than the cured resin layer 102, it is not covered with the cured resin layer 102 and maintains an exposed state.

Figure 5:
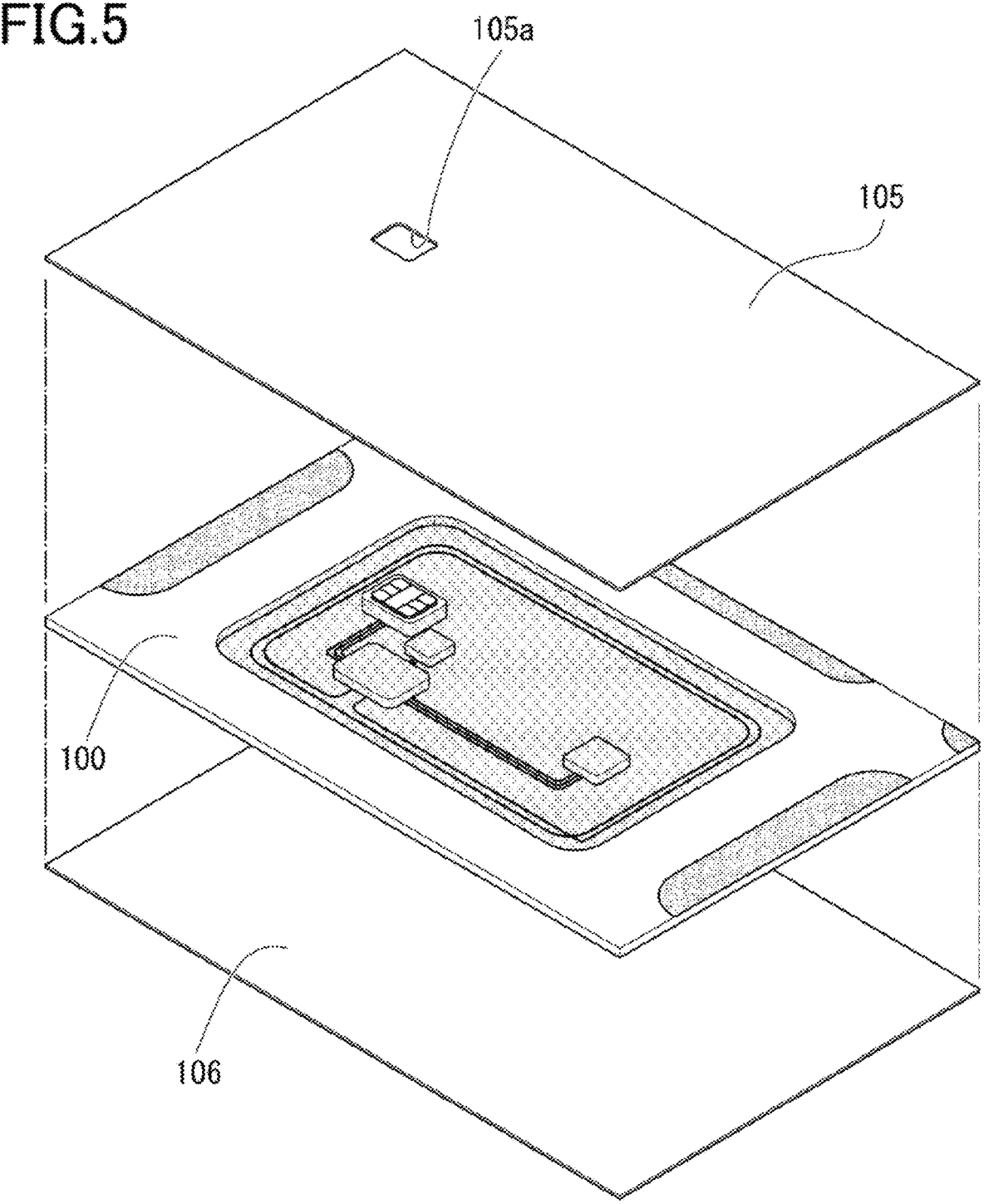
FIG. 5 is a diagram showing a process performed while manufacturing the IC card in FIG. 1.

Next, as shown in FIG. 5, the frame 100 and FPC are sandwiched between two plastic sheets 105 and 106 from above and below. The plastic sheets 105 and 106 each have an adhesive agent applied to the surface facing the frame 100 and the FPC, and the upper plastic sheet 105 has a hole 105a at a position corresponding to the terminal 10, which has the same shape as the terminal 10 in plan view, and has the same size as the terminal 10 in plan view.

Then, the primary lamination is performed by applying heat and pressure to the plastic sheets 105 and 106 attached to the frame 100 and FPC. As a result of primary lamination, the surface of the lower plastic sheet 106 facing the FPC is deformed according to the unevenness of patterns such as the loop antenna and the wiring formed on the FPC, but the deformation is absorbed by the thickness of the plastic sheet 106 and the surface of the plastic sheet 106 facing away from the FPC has substantially no unevenness.

Finally, the two plastic sheets 105 and 106 are sandwiched by two exterior plastic sheets (not illustrated) from above and below. The exterior plastic sheet on the upper side, like the plastic sheet 105, has a hole for the terminal, and the display 20 is provided by printing at a position corresponding to the fingerprint sensor module 40 on the surface facing the plastic sheet 105.

After the secondary lamination is performed by applying heat and pressure to the attached exterior plastic sheets, the IC cards 1 are completed by detaching them one at a time while being shaped.

Examples of the materials of the plastic sheets 105 and 106 and the exterior plastic sheets include PVC, PET-G, and PET which are the materials exemplified as the material of the frame. When the materials of the frame 100, the auxiliary resin frame 101, the plastic sheets 105 and 106, and the exterior plastic sheets are the same material, the primary and secondary laminations will fuse them together to form one piece. As a result, there is no interface on the outer surface of the completed IC card, which improves the sealing properties of the internal structure and also improves the appearance. Therefore, it is preferable that the materials of the frame 100, the auxiliary resin frame 101, the plastic sheets 105 and 106, and the external plastic sheet are the same material. Furthermore, because the resin at the outer surface that covers the sensor unit 41 is preferably a single layer from the viewpoint of transmission of ultrasonic waves, it is also preferable from this viewpoint for the plastic sheets 105 and 106 and the exterior plastic sheets to be made of the same material.

Moreover, the manufacturing method described above can also be executed in a case where the fingerprint sensor module 40 is slightly taller than the frame 100. In this case, the plastic sheet 105 or the exterior plastic sheet on the upper side may be provided with a concave portion that does not penetrate through the sheet, at a position corresponding to the fingerprint sensor module. As a result, the projection of the fingerprint sensor module can be absorbed by an amount corresponding to the depth of the concave portion.

The operations performed when using the IC card 1 configured as described above will be described.

A fingerprint of the user is registered as an initial setting at the start of use. In a state where the user is touching the position of the display 20 with the pad of the finger, the sensor unit, which has been wirelessly powered by an operation from an external device or the like, operates and reads the fingerprint. The fingerprint that has been read is saved in the storage area of the memory IC 50.

When confirming the identity of the user, the user touches the position of the display 20 with the pad of the finger. The IC module 30 receives and matches the fingerprint data read by the sensor unit with the data for matching saved in the memory IC 50, and allows various operations such as communication only when the data are matched. This will prevent spoofing by a third party other than the user using an IC card 1.

As described above, according to the IC card 1 of the present embodiment, because the fingerprint sensor module 40 including the ultrasonic fingerprint sensor (sensor unit 41) is provided, personal authentication using a fingerprint can be suitably performed, and the security is enhanced. Because ultrasonic waves pass through foreign substances attached to the finger, such as sweat and water, unlike a capacitive fingerprint sensor, the fingerprint can be stably read regardless of the humidity, the condition of the finger, and the like.

In addition, because ultrasonic waves pass through the skin to a certain depth, it is also possible to sense blood flow, and three-dimensionally detect ridges and sweat pores in the fingerprint. As a result of appropriately combining these, it is also possible to improve the fingerprint matching accuracy.

Furthermore, because ultrasonic waves pass through plastic, the fingerprint can be read without any problem even if the fingerprint sensor module 40 is covered with a plastic sheet constituting the outer surface. Therefore, it is not necessary to provide a through hole in the plastic sheet for exposing the sensor unit 41, or to accurately align the through hole, and the manufacturing process can be significantly simplified compared to a case where a capacitive fingerprint sensor is used. In addition, because the plastic sheet does not need to be transparent, the degree of freedom in designing the appearance of the IC card is greatly improved.

According to the method for manufacturing the IC card 1 described above, a frame is arranged on the FPC on which the internal structure is mounted, and a liquid resin is filled and then cured inside the frame-shaped region, which enables the resin layer that constitutes the outer surface of the IC card 1 to be formed by primary lamination and secondary lamination, while also protecting the internal structure with the cured resin layer 102.

Moreover, because the auxiliary resin frame 101 is arranged around the terminal 10, when the liquid synthetic resin is poured in, it is possible to suitably prevent the synthetic resin from attaching to the top surface of the terminal.

A second embodiment of the present invention will be described with reference to FIGS. 6 and 7. In the following description, those configurations that are common to the members already described are given the same reference signs, and duplicate descriptions are omitted.

Figure 6:
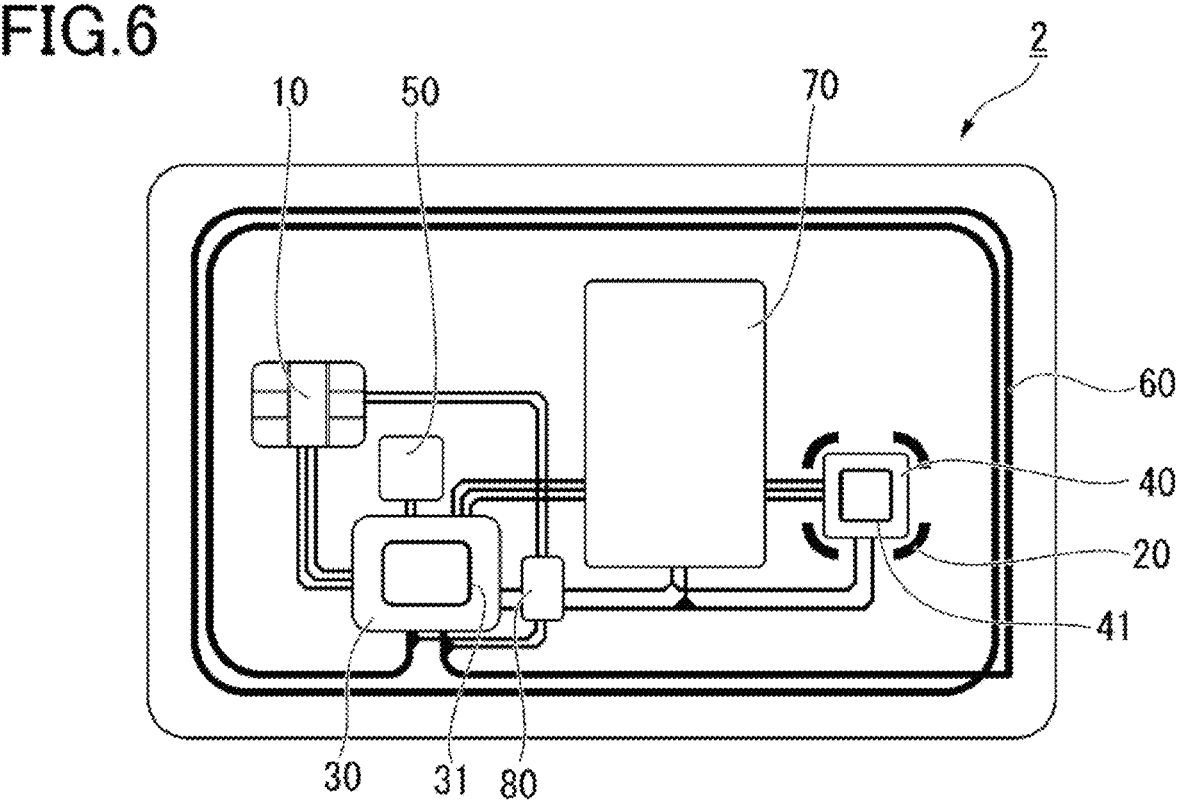
FIG. 6 is a transparent view showing an internal structure of an IC card according to a second embodiment of the present invention.
Figure 7:
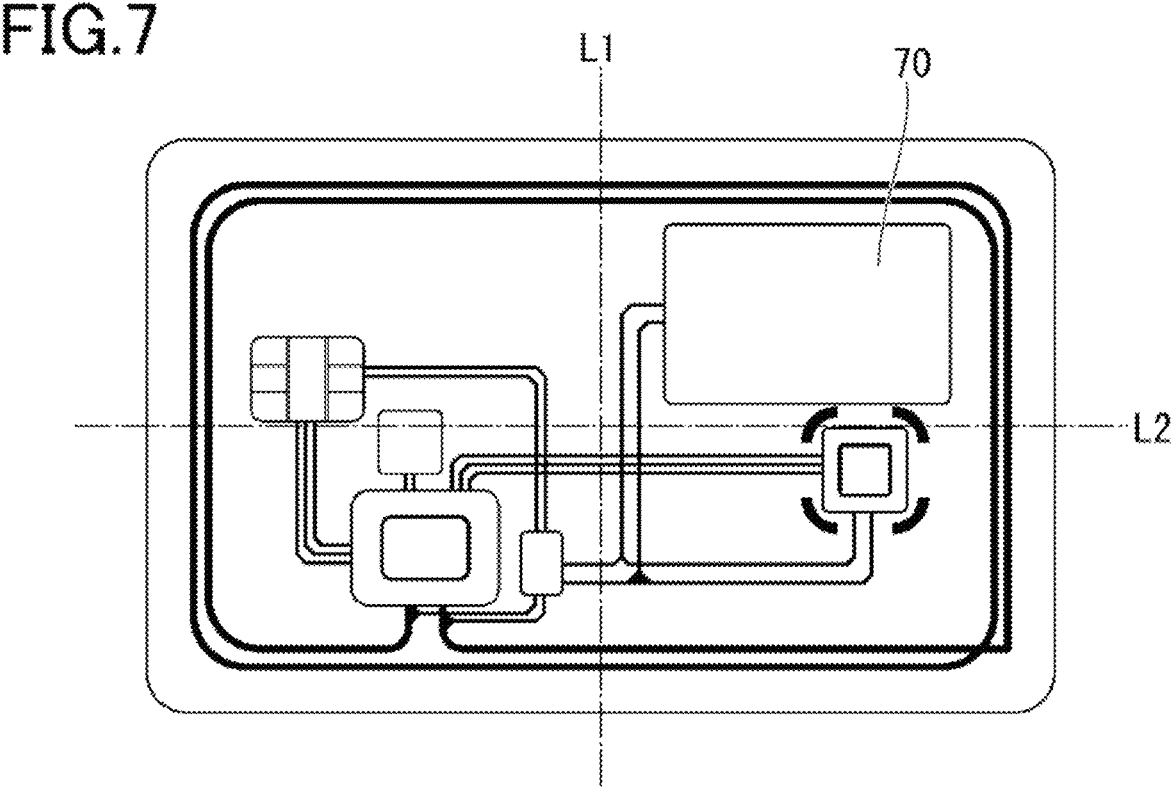
FIG. 7 is a transparent view showing the internal structure of a modification of the IC card in FIG. 6.

FIG. 6 is a transparent view showing the internal structure of an IC card 2 according to the present embodiment. The IC card 2 further includes a rechargeable battery (power storage unit) 70 and a charging IC 80, in addition to the internal structure described in the first embodiment.

A lithium ion battery is an example of the rechargeable battery 70. Although standards have been established that relate to the thickness range of an IC card to which the present invention is applied, lithium ion batteries with a thickness of about 400 μm are known, and the standard can be satisfied without any problem when such a lithium ion battery is arranged inside the IC card.

The charging IC 80 includes an IC chip, and is connected to the rechargeable battery 70. The charging IC 80 selects the charging input, and controls the charging by switching it on or off. In the present embodiment, the charging IC 80 is connected to the terminal 10 and the loop antenna 60. As a result, the IC card 2 handles inputs from two systems, namely input from the terminal 10 and input from the loop antenna 60, and although it is configured to be chargeable from either system, this is not essential and a configuration is possible that handles input from either one of the systems. The input from the terminal 10 has an advantage that charging can be performed efficiently, and the input from the loop antenna 60 has an advantage that the charging can be performed without the need for a special device when away from home.

The IC card 2 of the present embodiment provides the same effects as the IC card 1 according to the first embodiment.

Furthermore, because the rechargeable battery 70 is provided as a power storage unit, the fingerprint sensor module 40 can be stably operated. That is, although an ultrasonic fingerprint sensor has a greater power consumption than a capacitive fingerprint sensor, even when the wireless power supply from the loop antenna 60 is not sufficient, by supplying power to the fingerprint sensor module 40 from the rechargeable battery 70, it is possible to perform acquisition, matching, and authentication processing, registration processing, and the like, of the fingerprint data without being restricted by the location or environment.

In the present embodiment, an electric double layer capacitor may be used as the power storage unit. In this configuration, the charging IC 80 becomes unnecessary.

In either configuration, the thickness of the power storage unit is preferably 400 μm or less from the viewpoint of satisfying the standard mentioned above. However, as long as the thickness of the power storage unit is 450 μm or less, the above standard can be satisfied by providing a through hole in the FPC and arranging the power storage unit inside the through hole.

The area of the power storage unit in plan view is preferably 600 mm$^2$ or less. For example, in the case of a 20 mm×30 mm rectangular shape that satisfies the above, the power storage unit can be easily arranged with the other components of the internal structure inside a loop antenna that conforms to the card dimension standard. The power storage unit is, like the rechargeable battery 70 shown in FIG. 7, preferably arranged at a position away from the center line L1 in the long side direction and the away from the center line L2 in the short side direction in plan view of the IC card. As a result, the bending resistance of the IC card can be improved.

In the present embodiment, the IC module 30 may be configured such that registration or rewriting of the fingerprint is allowed only when power of a certain value or more is being supplied from the loop antenna 60, or when power is being supplied from the terminal 10. Because the power consumption of the fingerprint sensor module 40 is a maximum during the fingerprint data registration process, such a configuration enables the operation of the IC card 2 to be stabilized.

Although the embodiments of the present invention have been described in detail with reference to the accompanying drawings, specific configurations are not limited to the embodiments, which can be modified and combined within a scope not departing from the spirit of the present invention. Some of the modifications are described below. These can be appropriately combined.

In the IC card according to the present invention, the IC chip included in the IC module does not have to be arranged in the form of a module. For example, the IC chip may be arranged alone in an internal circuit.

The IC card according to the present invention does not have to be a dual IC card. Therefore, the configuration may be such that only one of contact communication and contactless communication is possible. Although the terminal 10 is not necessary in a configuration where only contactless communication is possible, the terminal 10 may be provided only for charging in a configuration where the power storage unit is included.

In the above description, although an example has been described in which the memory IC, which is a storage unit, is configured separately from the IC module, the memory IC may be omitted by providing the IC module with the function of the storage unit.

In the above description, although an example has been described in which the entire internal structure is mounted on one surface of the FPC, part of the internal structure may be mounted on the surface on the opposite side of the FPC such that the internal structure is mounted on both sides of the FPC. For example, only the fingerprint sensor module may be mounted on the surface on the opposite side of the FPC. In this case, after a frame is arranged on the surface on one side of the FPC to form a cured resin layer, a frame may be arranged on the surface on the other side of the FPC to form a cured resin layer.

The IC card according to the present invention may include a display that is capable of various displays. Alternatively, one or more LEDs (light-emitting diodes) may be provided. In these modes, various types of information (completion of registration of fingerprint data, result of fingerprint authentication, and the like) can be shown on the display, or by the light emission mode of the LED.

The display or the light-emitting diodes may be exposed through a hole formed in the plastic outer surface, and it is also possible to have a configuration in which the display or light emission is visible without exposure by having part of the outer surface to be transparent.

The display that indicates the position of the fingerprint sensor is not limited to printing represented by the display 20, and may be configured by unevenness in the plastic constituting the outer surface of the IC card. However, in this case, it should have a configuration in which the thickness and flatness do not affect reading of the fingerprint, and should be arranged to not overlap with the sensor unit 41 in plan view.

In the IC card, a switch may be arranged in or around the fingerprint reading area. In this case, the power consumption of the IC card can be suppressed by operating the fingerprint sensor only when the switch is on.

A suitable switch can be, for example, a capacitive touch sensor that is operated by power obtained by the loop antenna, or is controlled to be operated at the same time as the start of contactless communication. As a result of arranging a capacitive touch sensor over the sensor unit of the fingerprint sensor, the user can turn on the power of the fingerprint sensor or release the fingerprint sensor from a sleep mode with the natural action of touching the location indicated by the display. Because a capacitive touch sensor can detect a finger that is making contact through plastic, even in this configuration, effects such as the simplification of the manufacturing process and improvement in the degree of freedom of designing the appearance are not lost.

INDUSTRIAL APPLICABILITY

The IC card and the method for manufacturing an IC card of the present invention have a configuration in which security is enhanced without restricting the design.

[Reference Signs List] 1, 2 IC card; 10 Terminal; 20 Display; 30 IC module; 40 Fingerprint sensor module; 50 Memory IC (storage unit); 60 Loop antenna; 70 Rechargeable battery (power storage unit); 100 Frame; 102 Cured resin layer.

What is claimed is:

1. An IC card provided with an IC chip, and configured to enable at least one of contact communication and contactless communication, the IC chip comprising:
    an ultrasonic fingerprint sensor connected to the IC chip; and
    a storage unit in which fingerprint data for matching is stored; wherein
    an outer surface of the IC card is formed of synthetic resin, and
    the ultrasonic fingerprint sensor is covered with the synthetic resin, wherein
    the IC card comprises:
    a flexible substrate comprising a polyimide base material;
    a conductor layer on the flexible substrate, the IC chip, the storage unit and the fingerprint sensor are patterned in said conductor layer;
    a resin frame on the flexible substrate, the resin frame having an opening that exposes the IC chip, the storage unit and the fingerprint sensor; and
    a cured resin layer in the opening of the resin frame, the cured resin layer sealing the IC chip, the storage unit and the fingerprint sensor.

2. The IC card of claim 1, further comprising
    a terminal connected to the IC chip and exposed on the outer surface, wherein
    the IC card is configured to enable contact communication.

3. The IC card of claim 1, further comprising
    a loop antenna connected to the IC chip, wherein
    the IC card is configured to enable contactless communication.

4. The IC card of claim 1, further comprising
    a power storage unit that supplies power to the ultrasonic fingerprint sensor.

5. A method for manufacturing the IC card of claim 1, comprising:
    patterning a circuit comprising the IC chip, the ultrasonic fingerprint sensor, and the storage unit in the conductor layer on the polyimide base material of the flexible substrate;
    bonding the resin frame comprising a plurality of frame-shaped openings to the flexible substrate so that the circuit comprising the IC chip, the ultrasonic fingerprint sensor, and the storage unit is within a single frame-shaped opening of said plurality of frame-shaped openings and a resin of the resin frame surrounds the circuit; and
    filling and curing the synthetic resin inside the single frame-shaped opening to form the cured resin layer sealing the IC chip, the ultrasonic fingerprint sensor, and the storage unit.

6. The method of claim 5, further comprising sandwiching the flexible substrate with the resin frame and the formed cured resin layer between a first plastic sheet and a second plastic sheet and forming a laminate of the laminate of (a) the first plastic sheet, (b) the flexible substrate with the resin frame and the formed cured resin layer and (c) the second plastic sheet.

7. The method of claim 6, wherein each of the first plastic sheet and the second plastic sheet comprises a material selected from the group consisting of polyvinyl chloride (PVC), polyethylene terephthalate copolymer (PET-G), and polyethylene terephthalate (PET).

8. The method of claim 6, wherein the resin of the resin frame is selected from the group consisting of polyvinyl chloride (PVC), polyethylene terephthalate copolymer (PET-G), and polyethylene terephthalate (PET).

* * * * *